United States Patent [19]
Bartholomew et al.

[11] Patent Number: 5,680,442
[45] Date of Patent: Oct. 21, 1997

[54] VOICE MAIL COMMUNICATION WITH CALL BLOCKING

[75] Inventors: Dale Bartholomew, Vienna; Robert D. Farris, Sterling, both of Va.

[73] Assignee: Bell Atlantic Network Services, Inc., Arlington, Va.

[21] Appl. No.: 353,281

[22] Filed: Dec. 5, 1994

[51] Int. Cl.[6] .............................. H04M 1/66; H04M 3/42
[52] U.S. Cl. .............................. 379/67; 379/230; 379/216; 379/212
[58] Field of Search .................................. 379/67, 88, 89, 379/93, 210, 211, 230, 243, 207, 229

[56] References Cited

U.S. PATENT DOCUMENTS

| | | | |
|---|---|---|---|
| 4,313,036 | 1/1982 | Jabara | 379/230 |
| 4,371,752 | 2/1983 | Matthews et al. | 379/89 |
| 4,585,906 | 4/1986 | Matthews et al. | 379/89 |
| 4,602,129 | 7/1986 | Matthews et al. | 379/89 |
| 4,790,003 | 12/1988 | Kepley et al. | 379/88 |
| 4,932,042 | 6/1990 | Baral et al. | 379/230 |
| 5,012,511 | 4/1991 | Hanle et al. | 379/211 |
| 5,029,199 | 7/1991 | Jones et al. | 379/89 |
| 5,193,110 | 3/1993 | Jones et al. | 379/88 |
| 5,195,128 | 3/1993 | Knitl | 379/88 |
| 5,274,696 | 12/1993 | Perelman | 379/89 |
| 5,278,897 | 1/1994 | Mowery et al. | 379/212 |
| 5,353,331 | 10/1994 | Emery et al. | 379/58 |
| 5,377,186 | 12/1994 | Wegner et al. | 379/201 |
| 5,400,393 | 3/1995 | Knuth | 379/211 |
| 5,406,557 | 4/1995 | Baudoin | 379/207 |
| 5,418,844 | 5/1995 | Morrisey et al. | 379/216 |
| 5,436,957 | 7/1995 | McConnell | 379/95 |
| 5,475,732 | 12/1995 | Pester | 379/230 |
| 5,475,737 | 12/1995 | Garner et al. | 379/373 |
| 5,481,601 | 1/1996 | Nazif et al. | 379/230 |

OTHER PUBLICATIONS

Common Channel Signalling System No. 7 For ISDN and Intelligent Networks, Jabbari, B.; 8078 Proceedings I.E.E.E. 79(1991) No. 2.

Audio Messaging Interchange Specification (AMIS)–Analog Protocol. Version 1 Issue 2 Feb. 1992.

Primary Examiner—Dwayne Bost
Assistant Examiner—Thomas F. Presson
Attorney, Agent, or Firm—Lowe, Price, LeBlanc & Becker

[57] ABSTRACT

A system and method of effecting transfer of a message such as a voice message from one centralized messaging system to another centralized messaging system in a switched communications network having a plurality of central offices connected to subscriber terminals and connected together by trunks wherein the transfer of the message is effected through a common channel signaling network without using the trunks.

45 Claims, 6 Drawing Sheets

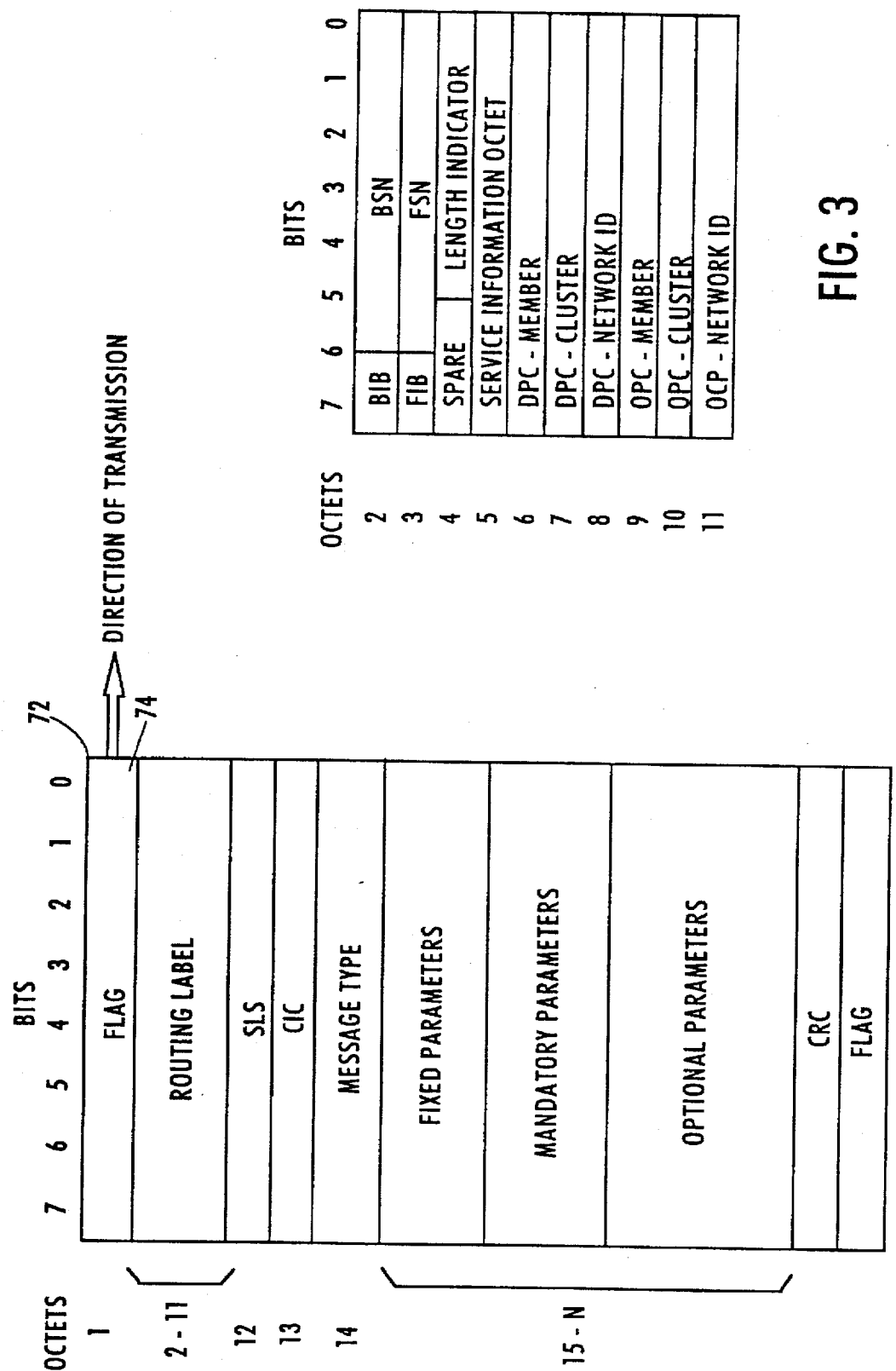

5,680,442

VOICE MAIL COMMUNICATION WITH CALL BLOCKING

TECHNICAL FIELD

The present invention relates generally to switched communications networks and providing voice mail services and more particularly relates to a system and method for providing communication between voice mailboxes in multiple mailbox systems using Common Channel Signaling (CCS) while obviating or blocking ringing signals.

BACKGROUND ART

Voice mail has become commonplace not only in business usage but also on an individual telephone service subscriber basis through Centrex service from a central office. A voice mail system is a specialized computer that stores messages in digital form on a fixed disk. The voice is generally digitized, usually at a much slower rate than the 64 Kb/s signal the central office uses in its switching network. The digitized voice is compressed and stored on a hard disk that maintains the voice mail operating system, system prompts, and greetings, and the messages themselves. A processor controls the compressing, storing, retrieving, forwarding and purging of files. A form of early systems is described in Matthews et al. U.S. Pat. No. 4,371,752 (hereinafter the Matthews '752 Patent), issued in February, 1983, and several related patents.

U.S. Pat. No. 4,585,906 (hereinafter the Matthews '906 Patent), issued Apr. 29, 1986 to Gordon H. Matthews et al. The Matthews '906 Patent is a continuation-in-part of the Matthews '752 Patent.

U.S. Pat. No. 4,602,129 (hereinafter the Matthews '129 Patent), issued Jul. 22, 1986 to Gordon H. Matthews et al. The Matthews '129 Patent is a continuation-in-part of the '752 Matthews Patent.

The three Matthews Patents each describe a voice mailbox type system using digital storage and programmed control to offer a wide variety of message storage, forwarding and delivery type services. The system architecture is essentially the same in each patent disclosure. With reference to FIG. 3 of the '752 Patent, the voice message system (VMS) 10 includes an administrative subsystem 60, a number of call processor subsystems shown as 62A–62C, and a digital data storage subsystem 64.

The call processor subsystems each include a microprocessor based single board computer 70, a memory 72 having for example 64K of RAM, a communication port interface 74, two disk adapters 76, 78 communicating with the storage subsystem via two storage buses and a block transfer interface 80 which communicates with the administrative subsystem (FIG. 4). The communication port interface 74 provides communication to and from the telephone lines via communication port driver modules 90A–B, each of which includes port drivers 92, CODECS 96 and voice connection arrangements 98 (FIG. 5). As shown in FIG. 6 of the '752 Patent, the administrative subsystem 60 includes a microprocessor based single board computer 100, a memory 110, a non-volatile memory 112, two disk adapters 114, 116 communicating with the storage subsystem via two storage buses and a block transfer interface 118 which communicates with the call processor subsystems.

In the '752 system, a message router program is informed of each occurrence of a new incoming message stored in the system. This program creates a message control block on disc for each message, and the message is thereby queued to each of the addresses selected by the person sending the message (see the '752 Patent, Column 29, lines 5–16). As disclosed in the '752 Patent, to deposit a message (FIG. 11), a user calls the VMS. The VMS answers the call and transmits an initial prompt message to the caller. The caller then inputs a unique authorization code identifying that person as a subscriber to the VMS service. Upon receipt of a valid authorization code, the VMS transmits a short progress tone and accepts an series of dialed digits representing an address input from the subscriber. Typically, an address is a single telephone number. The '752 system also offers the subscriber the option to select a previously established distribution list including a number of such addresses. After entry of all necessary address information identifying one or more destinations, the user inputs a "1" to initiate voice recording and then transmits a voice message. The VMS stores the voice message in one of the digital disc storage units 120 within the data storage subsystem 64 (FIG. 7). The user is then given the option to deposit another message, inquire about messages stored for the subscriber or terminate the session by hanging up.

To retrieve and replay stored messages, a subscriber initiates a routine referred to in the '752 Patent as the INQUIRY feature (see FIG. 21). A user can enter this routine after completion of message deposit as discussed above, or the user can initiate an inquiry by calling the VMS. Again, the VMS initially answers the call and transmits the opening prompt message to the caller. The caller inputs his or her unique authorization code which is verified by the VMS. The caller then enters a special function code (SFC) for an INQUIRY. The VMS determines whether or not any messages have been recorded for this subscriber. If there are no messages, the VMS plays a canned prompt so informing the subscriber. However, if there are messages recorded for the current caller, the VMS provides another canned message, and the person initiates playback by dialing a "2" (Column 26, lines 42–61). The caller can control the replay of the messages using additional dialed digit inputs, for example to repeat all or a segment of a message or to skip all or a segment of a message (table bridging Columns 23 and 24).

The VMS system disclosed in the '752 Patent will also automatically deliver messages to the identified addressees. In the DELIVERY routine (FIG. 15), the VMS calls the addressed recipient by dialing that person's telephone number. If the call is answered, the VMS plays a canned announcement which includes a request for the person answering the call to enter her unique authorization code. If there is no answer, the line is busy or the answering person does not enter the correct authorization code, the VMS will attempt to deliver the message again after a specified time period. When the answering party has responded by entering a valid authorization code, the VMS emits an idle tone, and the person can initiate playback by dialing a "2". The person listening to message playback can control the replay using additional dialed digit inputs, as discussed above (see Column 23, lines 30–65). The user is then given the option to redirect the message to another destination, deposit a reply message, save the message, or file the message for long term storage.

In the reply routine, the user records a message for the sender of the message just replayed. In the redirect routine, the user enters a new address, and if desired, records a new message. The new message is appended to the original message already held in digital storage, and both messages are delivered to the new addressee using the DELIVERY routine discussed above ('752 Patent, Column 25, lines 41–59, and FIG. 18).

The file function disclosed in the '752 Patent transfers a message to a "verbal file folder" for long term storage and later retrieval (Column 26, lines 11–18).

The '906 and '129 Patents include the subject matter of the parent '752 Patent discussed in detail above. The '906 and '129 Patents, however, add a number of message processing features. For example, these Patents add a delivery option referred to as "TIME-I.D. VALIDITY", which allows the user to specify a recipient and a date and time for delivery of a stored message.

The '906 and '129 Patents also expressly describe storing messages for an identified subscriber in terms of depositing messages "in the user's address". For example, one feature added in these Patents is a "Priority Hold" feature. As described, if the deposited message meets certain priority conditions, the "VMS would automatically dial the user's telephone rather than deposit the message in the user's address, thereby forcing delivery" ('906 Patent, Column 58, lines 4–12). Similarly, these Patents describe depositing messages "in the user owner's RO message address", as will be discussed in more detail below (see, e.g., '906 Patent, Column 70, lines 51–53). Such references to depositing messages in a "user's address" indication that the addressing of messages for each subscriber in the Matthews et al. system defines "message baskets."

The '906 and '129 Patents also disclose several features which permit access by non-subscribers. For example, a subscriber can be assigned a receive only (RO) message address. To receive messages from a subscriber by using this address, a non-subscriber may call the VMS using a direct inward dial line (DID). In the specific example given in the Patents, the subscriber might activate a call forwarding feature in the TELCO network whereby calls to her home telephone number are automatically forwarded to the DID/RO number into the VMS. When such a DID call comes in, whether forwarded or connected directly in response to dialing the DID number, the TELCO network will forward the last three or four digits of the DID number to the VMS system. The VMS uses the received digits to identify the RO address. If the subscriber prestored any messages in the RO address, the VMS will play those messages to the caller, otherwise the VMS will play a canned prompt indicating that the subscriber is not in ('906 Patent, Column 69, lines 27–62).

U.S. Pat. No. 4,625,081, issued Nov. 25, 1986, to Lawrence A. Lotito, et al (hereinafter referred to as the "Lotito Patent"). Referring to FIG. 1, the patent describes an automated telephone voice service system 100 which provides automatic recording and editing of voice messages as well as forwarding of recorded voice messages to other accounts and telephone numbers with or without operator assistance.

The system includes a data store 104 coupled to store and retrieve voice messages at each of a plurality of individually addressable message baskets 1-N and a control system 102 providing a selective coupling between the store and each of a plurality of telephone lines of a telephone network 108.

The data store may be physically implemented as one or more magnetic or electronic storage devices and may be distributed throughout a data processing system. The data store provides storage for a plurality of addressable message baskets, a plurality of individually addressable voice message prompts and client greetings, and an audit trail for each client accessing the system.

Each message basket provides storage for a plurality of voice messages and is segregated into an inbasket section and an outbasket section. The inbasket functions in a manner analogous to a recording mechanism for a telephone answering machine and stores voice messages and message forwarding notices directed by system users to account owners of the associated message basket. The outbasket portion receives voice messages for forwarding to selected other message baskets or to telephone network 108 users at indicated telephone numbers.

In a fully automatic mode, the control system 102 can operate to call the indicated telephone number and upon its being answered, communicate an appropriate recorded voice message prompt, communicate the voice message being sent, and then terminate the call. As an example, the voice message prompt might inform the person answering the telephone at the indicated number that the person is about to receive a prerecorded message from the account owner. The account owner, when setting up his account, establishes predetermined distribution lists and sets of delivery instructions. The delivery instructions can cover such features as days of the week and time intervals during which delivery may be made, number of retries, and whether the forwarding of the message is to be accomplished automatically or semiautomatically with operator assistance.

In a semiautomatic mode, the control system 102 waits for delivery conditions to be met, and then obtains ownership of an active operator console 106 including a terminal having a keyboard and a video display unit and an operator headset. The control unit informs an operator through the console 106 that a semiautomated message forwarding operation is to be undertaken and displays a prompting message for the operator to read. Upon command, the control system generates the Touch Tone signals corresponding to the recipient's telephone number and connects the operator console 106 to the line when it is answered. The operator informs the answering party of the call, asks to talk to a particular person at the called telephone number if appropriate, and secures the permission of the called party to forward the voice message. The operator then commands the control system to communicate the voice message stored in the outbasket to the called telephone line as indicated by arrow 114.

For voice messages forwarded to another inbasket rather than to a telephone number, the voice message is not actually recorded in duplicate in each of the designated inbaskets. Instead, a notification is stored in the inbasket which indicates that a forwarded message is stored by the system for delivery to the owner of the forwarding message basket. The notification indicates the particular outbasket and the particular message within the outbasket which is being forwarded. This enables the person sending the message to retain ownership of the message in his own outbasket and selectively change or delete the message until it has actually been delivered. Depending upon the delivery instructions of the sender and the preselected instructions of the recipient, a forwarded message might simply wait for delivery until the recipient retrieves the receipt of a message in his inbasket by a paging signal communicated over a paging system (not shown), by the illumination of an indicator light at the recipient's telephone, or by a telephone call to the recipient's telephone number informing the recipient by a prerecorded message that a message has been received in the recipient's inbasket.

The prompts and client greeting section of the data store 104 stores a plurality of individually addressable voice message prompts explaining how to operate the voice service system and a client greeting for each inbasket. The greeting invites the caller to leave a message but does not identify the specific owner of the inbasket which has been accessed by the call. Each client may record and change his own personal greeting at will.

The audit trail portion of the data store 104 stores a record for each caller accessing the system of the commands which have been given to the system by the caller. This record enables the control system to select particular voice message prompts.

The particular functions executed by the control system depend upon by which one of the functionally different types of telephone lines the control system is accessed and upon the keyboard commands which are entered.

The control system responds to an incoming call on a client's normal use telephone line (secretarial line) by waiting for a predetermined number of rings and then answering the telephone. The client greeting is accessed in the data store and communicated to the caller. The caller is invited to leave a message, which remains in the client's inbasket until retrieved by the client. A sophisticated caller who is familiar with the system is free to edit the voice message.

Another type of line upon which a call might come into the system is a direct incall line. This line is dedicated to the particular inbasket of the client and is not available for general use by the client.

A general incall line is similar to a direct incall line except that it is not associated with any particular message basket or inbasket. Upon accessing the system through a general incall line, a caller is prompted to enter a message basket number. The caller then is able to leave a message in a selected basket.

A general access line is intended primarily for clients of the VSS and affords the broadest range of system functions. Upon calling in on a general access line, a client is prompted to enter his personal ID number if he desires to have access to the ownership privileges of his own account. This provides immediate access to message retrieval and the control system informs the caller whether or not there are any messages within his inbasket and, if there are, begins communicating the voice messages over the connected telephone line. Before each message is retrieved, the caller is informed of the age of the message. After reviewing the incoming messages, the caller is informed of the status of any outgoing messages in the caller's outbasket which are awaiting delivery.

The telephone voice service system is implemented with a data processing system. As shown in FIG. 2 a telephone network 108 provides a number of physically different types of telephone lines to which connection must be made by the service system through a concentrator 202 up to 640 secretarial lines are connected to a telephone room subsystem 206. Telephone room subsystems 214 and 216 are connected to special service telephone lines such as DID or DX tie lines. The concentrator and telephone room subsystems are physically located at one or more telephone company central offices or client PABX centers. The telephone room subsystems operate as interfaces between the digital portion of the service system and the analog telephone lines and trunks. It is possible for each telephone room subsystem to connect to up to 1260 voice grade circuit terminations. The system can accommodate up to 4 telephone room subsystems.

Up to 4 real time subsystems receive the voice and control data from the 4 telephone room subsystems. The real time subsystems provide selected switching connection between channels and communicate with an information processing system 250 for storage and retrieval of voice messages and system control.

An interactive service subsystem 252 provides a communication connection between the information processing system 250 and input/output devices for the service system. The input/output devices may include keyboard display terminals 266, 268 and 270 within operator consoles 106, a printer 262 and a card reader 264.

In addition to the systems described in the foregoing patents networking of voice mail systems has also been implemented to permit users in one location to use voice mail in other locations. The simplest form of networking voice mail is to use guest mailboxes, which are boxes assigned to persons outside the system. Another method of networking voice mail has been to terminate the voice mail on one switch and connect other switches to the central switch with networking software. A third method has been to network the voice mail systems themselves. However, generally speaking, the networked systems must be of the same manufacture because there are no standards for communication between systems. Work is underway to develop a set of standards known as Audio Message Interchange Service (AMIS) in the hope that when AMIS standards are approved, they will form a common language that network voice mail systems can support so voice mail of different manufacture can communicate.

It is accordingly an object of the present invention to provide a system and method for effecting mailbox to mailbox communication in an expeditious and economical fashion basically utilizing existing equipment and network facilities. It is a feature of the invention that it permits such communication between mailbox equipment of different manufacturers. It is a still further feature of the invention that this is accomplished while blocking off the voice trunking network and blocking ringing of the telephone station corresponding to the recipient mailbox. This provides a significant lightening of the traffic load on the network trunking system, among other advantages which will become apparent upon the following description of the invention.

Disclosure of the Invention

Architecture of Switched Telephone Networks Using an Advanced Intelligent Network (AIN)

According to the present invention it has been discovered that it is possible to implement mailbox to mailbox data communication to transfer voice messages using the existing advanced intelligent network (AIN) in public switched telecommunications networks in the United States. The AIN conventionally provides services based on feature logic and data located at a centralized node in the network known as a Service Control Point (SCP). Appropriately equipped switches in the network, known as Service Switching Points (SSP's), communicate with the SCP and together they provide various AIN services. The SSP knows which calls require AIN service based on characteristics of the call, such as the line it originated from or the digits that were dialed. The process of identifying calls that require AIN processing is known as "triggering", since a particular characteristic of the call "triggers" to switch into providing AIN treatment. Once a trigger occurs, a query message is sent to the SCP asking for instructions. Based on information contained in the query message, the SCP determines which service is being requested and provides appropriate information such as routing and billing instructions that the SSP then executes to complete the call. Only the SCP "knows" which service is being performed on a particular call. The SSP simply knows how to identify calls that require AIN processing and how to execute instructions provided by the SCP. For this reason, two services that are very different from the viewpoint of the subscriber and the SCP may appear identical to the SSP since it performs the same basic functions for both.

Current program controlled switches such as the AT&T 5ESS and 1AESS and comparable switches from other manufacturers are provided with an Advanced Services Platform (ASP) which provides SSP and Network Access Point (NAP) capabilities. ASP provides services independent triggering and call processing capabilities and also supports OA&M (Operations, Administration and Maintenance). These capabilities interwork with many existing switch based features. SSP capabilities enable end offices and access tandem offices to interface with SCP databases using Common Channel Signaling 7 (CCS7) Transaction Capabilities Application Part (TCAP) protocol to implement services. These services include standard equal access multi-frequency (EAMF) and CCS7-ISDN user part (ISUP) interfaces to a network access point (NAP) switch, standard CCS7-TCAP interfaces to an SCP database, call processing triggers, non-call processing triggers such as test queries, customized announcements under the control of an SCP, such as terminating announcement or play announcement and collect digits, connection control under control of the SCP, business and residence custom services (BRCS) interworking, new terminating restrictions, ISDN interworking, notification of call termination (returned to SCP), enhancements for OA&M, and billing under control of the SCP. Further details are provided in AT&T 235-190-125 October, 1990. As there described, voice mail is readily implemented.

According to the present invention caller to remote mailbox and/or mailbox to remote mailbox communication is provided using TCAP and SS7 messaging in the AIN while blocking or obviating trunking of voice messages. This is advantageously accomplished using existing voice mail equipment because that equipment is currently interfaced to the telephone network and is fully responsive to TCAP and SS7 protocols.

According to the invention, a caller desiring to leave a voice message in the mailbox of a remote person may use a telephone to access his own voice mail system and mailbox and speak the message. The voice processing unit of the mailbox may operate its voice menu to direct the caller to depress a specified key when satisfied with the message. It may then query the caller as to whether he desires to send the message and, if so, to depress another specified key. The voice unit then may instruct the caller as to the procedure for keying in the identity of the destination and to depress a further specified key to send the message. The message is digitized in conventional fashion and stored in the mailbox of the sender. The caller may go on hook after depressing the designated send key. The depression of the send key causes the generation of a tone or other signal which is recognized by the acting SSP as a trigger. This local connection ends usage of the voice network.

The trigger causes the SSP to frame a TCAP inquiry message which is directed to the SCP for instructions. The TCAP message includes information identifying the calling station and mailbox and the called station and the fact that the caller is requesting mailbox to mailbox message transfer. The SCP consults its database to establish whether the caller is authorized to communicate mailbox-to-mailbox and as to the existence and identity of a mailbox for the called number. The SCP then originates a response to the SSP to dispatch one or more SS7 packets to the called directory number and mailbox along with an appropriate routing label and handling instructions and carrying as the included information in the SS7 packet the digitized voice retrieved from the mailbox of the sender. The information may be in T1 protocol which is conventionally the output digital signal of mailbox equipment regardless of manufacture.

Thus any translation which is necessary between the digitized message in the mailbox and the T1 or equivalent protocol used in the SS7 packets inherently occurs in the equipment furnished by the manufacture.

The number of SS7 packets which may be required will be dependent upon the length of the message as in conventional packet communication. Each packet includes a suitable header which permits reassembly in the original order at the destination. The fact that the packets may not arrive at the destination in the same order as originated is of no consequence in that real time voice communication is not involved in the transfer.

The dispatched SS7 packet communication proceeds through the common channel signaling SS7 network until all of the packets are received at the destination. It is a feature of the invention that the redundancy of the SS7 network and packet switching techniques may entail individual packets traveling different routes to the same destination. This redundancy is utilized as a feature of the invention to enable the existing SS7 network to handle the digital packet communication involved without overload.

When the packets reach the destination SSP and end office (EO) the packet headers contain the necessary information to direct the packets directly into the mailbox without setting up a connection to the associated telephone station and without initiating ringing of the telephone. The packets arrive in their transmitted form containing T1 protocol digitized voice which the recipient mailbox equipment is designed to receive and deposit as a digitized voice signal in the mailbox. Again, any necessary translation is accomplished by the existing mailbox equipment by virtue of the fact that its vendor must assure that it is compatible with the switched telephone network. Deposit of the message in the destination mailbox is followed by the customary notification of the mailbox proprietor that a message is waiting. The proprietor may then access the mailbox in conventional fashion and have the message delivered as an audio voice message in the usual fashion. The recipient then has the option of returning a message in a converse fashion by depressing predetermined keys at his telephone station which utilizes the information in the packet header to reverse the origination and destination identifications.

Because current model SCP's include billing modules they can also effect billing. The data is sent out through the ISCP so that it can either be directed to the revenue accounting office on a direct line or send a TCAP message back into the SSP or end office switch to the originating number responsible for the origination of the call. Billing can be accomplished in any desired fashion, such as in bits per second, call setup, number of packets, or any combination or the same. The billing information may go into the journal on the switch to be forwarded to the revenue accounting office. The system of the invention is particularly suited to delivery of the same mailbox message to multiple mailbox destinations.

BRIEF DESCRIPTION OF DRAWINGS

FIGS. 2 and 3 illustrate in graphic and tabular form respectively the protocol of an SS7 data signal.

BEST MODE FOR CARRYING OUT THE INVENTION

One system for providing a Common Channel Signaling Network (CCSN) utilizes Signaling System 7 (SS7) protocol in a Packet Switched Data Network (PSDN) connecting Network Elements (NE) via packet switched 56 Kb digital data circuits. In addition to providing call set signaling functions, the SS7 network also provides access to switching control points (SCP's) used to permit line identification database (LIDB) look-up for 800 services. Class services also use the SS7 network to provide custom call features. The latest services using the SS7 network comprise Advanced Intelligent Network (AIN) services. AIN services use the SS7 network to access an Integrated Switching Control Point (ISCP) where AIN service functions are performed.

Figure 1:
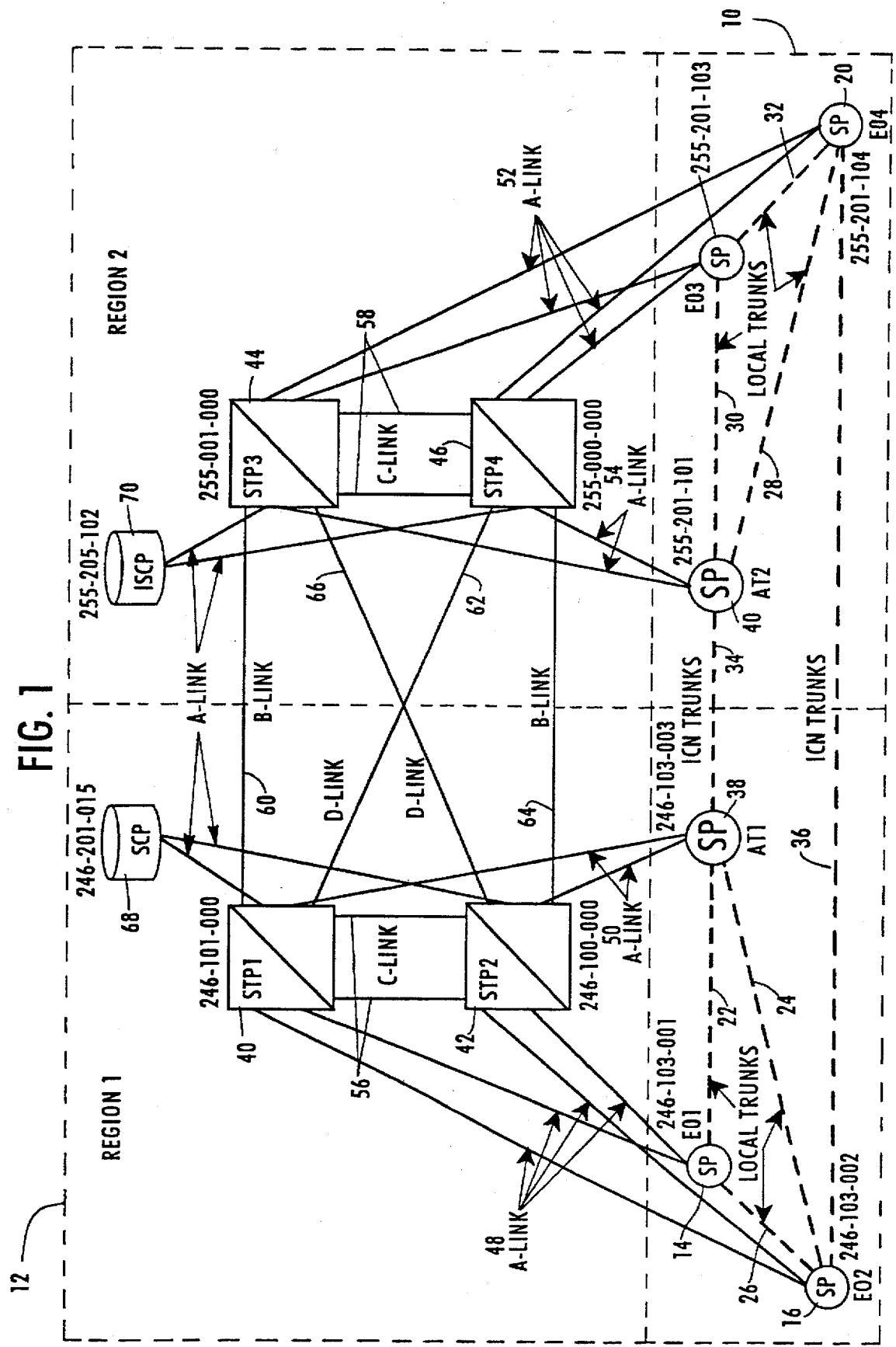
FIG. 1 is a block diagram of a Public Switched Telephone Network and its SS7 signal control network.

Referring to FIG. 1 there is shown a block diagram of a public switched telephone network and the SS7 network that is used to control the signaling for the switched network. Thus an analog switched telephone network is generally indicated at 10 having a common channel signaling network in the form of an SS7 network illustrated generally at 12. The switched telephone network consists of a series of central offices which are conventionally referred to as signaling points (SP's or SSP's) in reference to the SS7 network. Certain of these SPs comprise end offices (EOs) illustrated at 14, 16, 18 and 20 as EOs 1-4 in FIG. 1. Each signaling point has a point code comprising a 9-digit code assigned to every node in the network. In FIG. 1 EO1 has a point code of 246-103-001, EO2 has a point code of 246-103-002, EO3 has a point code of 255-201-103, and EO4 has a point code of 255-201-104.

The end offices EO1 and EO2 represent end offices in the region of one regional operating company, while end offices EO3 and EO4 represent end offices of the region of a different operating company. Each operating company has its own network ID, shown here as 246 for the left region and 255 for the right region in FIG. 1. The number 103 in the designation 246-103-001, is the number of the cluster. A cluster can hold 32 SPs or members, the member being designated by the final 3 numbers. Thus 246 may represent C & P of Virginia Regional Operating Company, cluster 103, member EO2 for EO2 when viewed from an SS7 standpoint. The broken lines connecting the SPs together may be analog trunks or voice or similar circuits. The SPs in a given region are connected together by local trunks 22, 24 and 26 in the left region and 28, 30 and 32 in the right region. The SPs in one region are connected to the SPs in other regions via inter-exchange carrier network trunks or ICN trunks 34 and 36 in FIG. 1 connected to Access Tandems (ATs) 38 and 40 (AT1 and AT2). These SPs or ATs are shown as having point codes 246-103-003 and 255-201-101 respectively.

Referring to FIG. 1, the SS7 network 12 comprises a series of Signal Transfer Points (STPs) shown here at 40, 42, 44 and 46 designated STP1, STP2, STP3 and STP4. Each STP in a network is connected to the SPs in the network by A links indicated at 48, 50, 52 and 54. STP1 and STP2 constitute a mated pair of STPs connected by C links 56 while STP3 and STP4 constitute a mated pair connected by C links 58, each mated pair serving its respective transport area. It will be understood that there may be multiple mated pairs per region, one for each designated transport area. STP1 is connected to STP3 by B link 60 and to STP4 by D link 62. STP2 is connected to STP4 by B link 64 and to STP3 by D link 66.

As will be understood, the A, B, C and D links are physically identical with the designation relating to cost in terms of ease of access. The A links represent the lowest cost. B and D links have the same route cost with respect to SS7 so that the D designation is used only because it extends diagonally in the drawing. The C links are used to communicate between the two paired STPs for network management information and also constitute another route. The STPs in mated pairs have the same translations. Thus the translations in STP1 are the same as the translations in STP2, and the translations in STP3 are the same as the translations in STP4. The C links communicate between the paired STPs for network management information and SS7 message routing. The STP pair cannot function without the C links. Therefore, unnecessary utilization of the C links causes congestion and prevents the paired STPs from performing their intended function.

The STPs are connected to Signal Control Points (SCPs) indicated in FIG. 1 as an SCP 68 and an ISCP 70. The ISCP is an Integrated Signaling Control Point, which is basically the same as an SCP but comprises a larger and more powerful computer. AIN may also be regarded as another ISCP. SCPs are usually used for 800 and credit card services with ISCPs being used for AIN. However, this is optional. The ISCP may hold application information as well as routing information whereas an SCP contains routing information, i.e., routing tables.

The SS7 network constitutes a highly redundant data network, generally a 56K switched data circuit. By way of example, an SS7 message from EO2 to EO4 might travel any one of 8 possible routes. It could go from EO2 to STP1, from STP1 to STP3, STP3 to EO4. One variation on that route would be from STP1 down the D link 62 to STP4 to EO4, and so forth. In the event that a link between STP3 and EO4 was lost, an SS7 route could be established from EO2 to EO4 via STP1 to STP3 and then via C link 58 to STP4 to EO4. However, that would be an undesirable route in unnecessarily using the C link. A links provide direct connectivity while C links provide circuitous routes using extra switches, a situation to be avoided. An alternate route would be from STP1 via D link 62 to STP4 to EO4. Another reason for not using the C link is to avoid tying up the entire STP3-STP4 pair.

The operation of placing a call from EO2 to EO4 may be described as follows: The user at EO2 picks up his phone and dials the number that resides in EO4. The SP generates an Initial Address Message (IAM). This message would have the destination point code of EO4, namely, point code 255-201-104. It would have an originating point code of EO2, namely, 246-103-002, in addition to miscellaneous other information needed for call set-up. That message would then be sent to either STP1 or STP2. Assuming that the message goes to STP1, STP1 would look at the message and determine that the message was not for it as an STP but rather is for EO4. STP1 would then investigate possible routings to get to 255 or EO4. B and D links are available and STP1 would choose one of the two. Assuming that it chooses the B link to STP3, STP3 repeats the same procedure. It determines that the message is for 255 or EO4 and puts that message on the A link to EO4.

EO4 gets the IAM which has the called telephone number in it and determines whether or not the line is busy. If the line is not busy, EO4 generates an Address Complete Message (ACM) to indicate that it received the request for a call and that the number is not busy. That message is sent back by simply reversing the point codes. Now the destination point code is EO2 and the originating point code is EO4. The message goes back to EO2 to indicate that the IAM was received and processed. As soon as the phone is answered at EO4, EO4 sends an Answer Message (ANS) back to EO2 indicating that the phone at EO4 was picked up, and at that time the trunks are connected together. EO2 connects its user to that trunk and EO4 connects its user to that trunk so that communication is established. All such messaging may occur in about 600 milliseconds which would be average but not necessarily fast.

The foregoing constitutes the function of the STPs insofar as routing is concerned. The STPs look at a point code and if it is not for them they just pass it on via a route determined from translations and routing tables. The C link is the last route permitted and is not utilized unless no other route is available.

As opposed to the foregoing, where the point code was for EO4 and not STP1, the point code may be for STP1. One example of such a situation would be the case of an 800 call. The 800 number is a fictitious number which is associated with a POTS number in a database in the SCP. Thus if EO2 makes an 800 call to EO4 it is necessary to determine the real telephone number. EO2 launches a Switching Connection Control Park (SCCP) message, which is a database request. This point code has a destination point code of an alias which is the point code of STP1 and STP2. STP1 and STP2 have various point codes indicated in FIG. 1 as 246-100-000 and 246-101-000. They also have alias point codes that indicate that they have a function to perform. Upon recognizing such a point code the STP does a data search and generates another SCP message to perform a database dip. This returns the real telephone number and the STP now has the destination point code of the real telephone number message. This is sent back to EO2. STP1 determines that this message is not for me but for EO2. The message is sent back down to EO2. EO2 now has a real telephone number and the system performs the IAM and ACM procedure all over again to set up the call. The only difference between a regular direct call and an 800 call is the necessity to perform the dip to obtain the real number first. This procedure takes about 1.3 seconds because of the additional operation. The STPs have various databases, such as the 800 database and the credit card database, and there is still a further database for AIN. It is these databases which are utilized for the purposes of the present invention.

The SS7 protocol describes how the signal messages are built and routed and provides for network management of the SS7 network itself. Thus if a link between EO4 and STP3 were to be lost, STP3 generates a transfer restricted message (TFR) to all nodes, i.e., all SPs connected to STP3, indicating that traffic is not to be sent to STP3 for EO4 because no route from STP3 to EO4 exists. If both A links to EO4 were down, EO4 would essentially be isolated and the STP pair STP3 STP4 would broadcast a transfer prohibited (TFP) message indicating that nothing should be sent to the pair for EO4.

In the transfer restricted situation it would be possible for STP3 to reach EO4 via the C link to STP4. This is a non-favored route but would be used in necessity. Handling such situations is the purpose of network managing messages. Congestion control or TFC accomplishes basically the same thing except that it constitutes a more sophisticated message limiting use of a circuit by stopping messages below a certain priority. Each message has a different priority. IAMs have a priority of 1 where ANS messages have a priority of 2.

Upon congestion occurring in the STP node for EO4 a new call could not be sent to EO4 because it constitutes a priority 1 message which is restricted because the congestion level is 2. Only priority 2 messages and higher would be permitted. If a call is already existing it could be answered or released. Releases have a priority of 2 to permit call completion. New calls could not be initiated until the congestion had been removed or lowered to congestion status 1 or 0.

The SS7 network constitutes a sophisticated network having a high predictability which is spelled out in the predetermined protocol. The SS7 messages traverse the network at all times. The messages themselves comprise digital serial messages of various length that come into the STP. The start of the message is identified by a flag which is a zero followed by 6 ones and another 0. This constitutes a unique bit pattern in the SS7 protocol. The protocol ensures that this particular pattern is not repeated until the next message. This provides a flag at the beginning of a new message. A flag at the end of a message is also provided usually in the form of the flag at the beginning of the next message, i.e., a message usually contains only one flag. The message is arranged in 8 bits or in octets. These octets represent the information carried by the message. The message contains both fixed and variable parameters. The Message Transport Part (MTP) of the SS7 message is always in the same place. The values change but the MTP is always in the same place.

Referring to FIGS. 2 and 3, the start of a message is indicated at 72 with the commencement of the flag 74. The first 7 bits following the flag constitute the Backward Sequence Number (BSN). The eighth bit is the backward indicator bit which is used to track whether messages have been received correctly. The backward sequence number was the forward sequence of the other node's message when it was sent. Referring to FIG. 1, if EO2 sends a message to EO4, EO2s include a Forward Sequence Number (FSN) in the 3rd octet of its message. Upon receiving this message, EO4 will include a Backward Sequence Number (BSN), equal to the FSN sent in the previous message in its next message to EO2. This indicated to EO2 that EO4 received the first message. This constitutes a positive acknowledgment of receipt of a message. If the eighth bit of the second octet or Backward Indicator Bit (BIB) is inverted, it indicates a failure to receive the identified message. If the 8th bit in the 2nd octet, Backward Indicator Bit (BIB), is inverted, it tells the receiving node that the identified message was not received. The accompanying BSN represents the last message that was received. The receiving node will then invert its Forward Indicating Bit (FIB), 8th bit of the 3rd octet, acknowledging a retransmission remission request, and will begin to send the missing messages until the transmitting end successfully acknowledges all remaining messages, i.e.:

EO2 sends a message with a FSN of 5 to EO4;

EO4 transmits a message back to EO2 with an inverted BIB and a BSN of 2, indicating that was the last message it received;

EO2 then inverts its FIB and retransmits message 3;

If EO4 acknowledges this message correctly (BSN of 3) EO2 will retransmit message 4 and then 5.

Thus between the BIB and FIB and BSN and FSN, the STP keeps track of all of the messages sent between the two nodes at each end of a link. This provides predictability. If a node fails to receive an acknowledgment within a predetermined period of time it will take the link out of service because it is receiving no acknowledgments. This is usually a short period of time such as 1.6 seconds.

Every 8 bits represents another part of the message until the end of the message. At about the fourth octet there is a length indicator to indicate the length of the message. In this case the message is bad in that it indicates six which is not a complete message. Assuming a complete message where the length indicator indicates 23 octets, this provides another means for error detection. Thus if the recipient counts to 28 this indicates that something is wrong and the message is sent again.

Octet 5 is the Service Information Octet (SIO). This indicates whether it is a Fill In Signal Unit (FISU), Link Service Signaling Unit (LSSU) or Message Signaling Unit (MSU). MSUs are used for setting up calls or 800, LSSUs are used for alignment, and FISUs are fill in signals. Thus an LSSU is seen only if the link is out of service and going back into service or going out of service.

Octets 6–11 contain the point codes. Thus the point code 235-81-8198 is the point code which would be read in FIG. 3. This is backwards as it comes from the message which arrives number, cluster, network ID in the order of bits received. That constitutes the routing label telling the STP and the nodes where the message came from and where it is going. Other parameters are involved depending upon the kind of message. If this were a FISU, that would be it. There would be 16 other bits that have Cyclic Redundancy Codes (CRCs) in them and another flag which would constitute the end. CRCs constitute a further error detection code which is a legal 1 function in the protocol. From the foregoing it will be seen that the messages contain various fields. This describes the basic format of an SS7 message which is the same for all messages of the same type.

The SS7 protocol consists of four basic sub-protocols:

Message Transfer Part (MTP), which provides functions for basic routing of signaling messages between signaling points.

Signaling Connection Control Part (SCCP), which provides additional routing and management functions for transfer of messages other than call set-up between signaling points.

Integrated Services Digital Network User Part (ISUP), which provides for transfer of call set-up signaling information between signaling points.

Transaction Capabilities Application Part (TCAP), which provides for transfer of non-circuit related information between signaling points.

Architecture of A Telephone Network with Voice Mail

Figure 5:
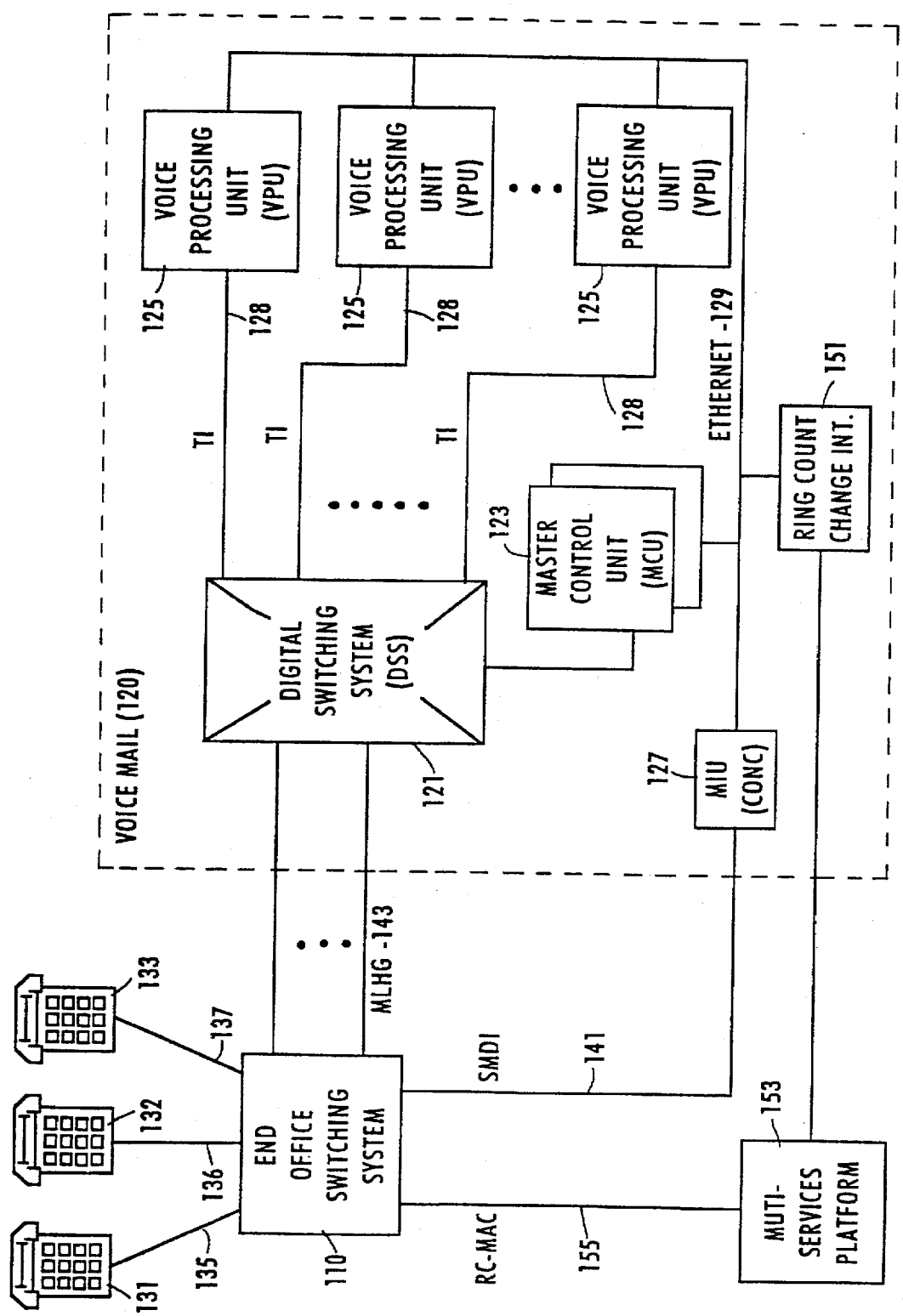
FIG. 5 shows details of a voice mail system usable with the invention and incorporated in one type of telephone network.

In FIG. 5, there is shown a voice mail implementing communication system which includes at least one switching system 110 and at least one centralized message service voice mail system 120. The switching system 110 may be a local or "end office" type telephone central office switch, such as a 1AESS or 5ESS switch sold by American Telephone and Telegraph.

The end office switching system 110 typically includes, among other components, a space or time division switching matrix, a central processing unit, an input/output device and one or more data communication units. Structurally, the switching system 110 is a standard central office telephone switch. Each subscriber has at least one piece of customer premises equipment, illustrated as telephone station sets 131 to 133. Local telephone lines 135 to 137 serve as communication links between each of the telephone station sets 131 to 133 and the end office switching system 110. Although shown as telephones in FIG. 5, the subscriber station equipment can comprise any communication device compatible with the line. Where the line is a standard voice grade telephone line, for example, the subscriber station equipment could include facsimile devices, modems etc.

The centralized message service or voice mail system in the illustrated example comprises voice messaging equipment such as a voice mail system 120. Although referred to as "voice" messaging equipment, equipment 120 may have the capability of storing messages of a variety of different types as well as voice messages. For example, a single system 120 may receive incoming messages in the form of audible messages, such as voice messages, as well as text format data messages. The voice messaging equipment 120 may also store messages in an image data format, such as facsimile. Message service systems having the capability to store messages in a variety of audible, data and image formats are known, see e.g. U.S. Pat. No. 5,193,110 to Jones et al., U.S. Pat. No. 5,008,926 to Misholi and U.S. Pat. No. 4,652,700 to Matthews et al.

The illustrated voice mail system 120 includes a digital switching system (DSS) 121, a master control unit (MCU) 123, a number of voice processing units (VPU's) 125 and a master interface unit (MIU) or concentrator 127. The master control unit (MCU) 123 of the voice mail system 120 is a personal computer type device programmed to control overall operations of the system 120.

Each of the voice processing units 125 also is a personal computer type device. The voice processing units 125 each include or connect to one or more digital mass storage type memory units (not shown) in which the actual messages are stored. The mass storage units, for example, may comprise magnetic disc type memory devices. Although not specifically illustrated in the drawing, the voice processing units 125 also include appropriate circuitry to transmit and receive audio signals via T1 type digital audio lines. To adapt the system 120 to receive information other than voice and/or offer services other than voice mail, one or more of VPU's 125 might be reprogrammed to run other types of applications and/or process other types of incoming information. For example, one such unit might process facsimile information, one might process E-mail, etc.

An ETHERNET type digital network 129 carries data signals between the MCU 123 and the voice processing units 125. The Ethernet network 129 also carries stored messages, in digital data form, between the various voice processing units 125. The system 120 further includes T1 type digitized audio links 128 between the DSS switch 121 and each of the voice processing units 125.

The voice mail system 120 connects to the switching system 110 via a number of simplified message desk interface (SMDI) type data lines 141. Specifically, these SMDI links 141 connect between one or more data units (not shown) in the end office switching system 110 and the MIU 127 in system 120. Each SMDI line 141 carries 2400 baud RS-232 data signals in both directions between the voice mail system 120 and the switching system 110. The MIU 127 is a data concentrator which effectively provides a single connection of as many as thirty-two SMDI lines into the MCU 123 of the voice mail system.

The voice mail system 120 also connects to the end office switching system 110 via a number of voice lines 143 which form a multi-line hunt group (MLHG) between the switch matrix within the switching system 110 and the DSS switch 121 of the voice mail system 120. Typically, the MLHG lines 143 consist of a number of T1 type trunk circuits which each carry 24 voice channels in digital time division multiplexed format.

The above described voice mail system architecture is similar to existing voice mail type central messaging systems, such as disclosed in U.S. Pat. No. 5,029,199 to Jones et al., although other messaging system architectures such as disclosed in the other patents cited above could be used.

For purposes of the present embodiment, the voice mail system 120, or other centralized messaging system, will further comprise a ring count change interface 151. The interface 151 connects to the Ethernet network 129 and provides two-way data communication between the network 129 in the voice mail system 120 and a multi-services platform (MSP) 153. For example, the unit 151 might provide a 9600 baud data channel over a line to the platform 153.

The interface 153 will receive packets of data over the Ethernet network 129 indicating changes in the status of the various subscribers' mailboxes. These packets of data will identify a particular subscriber and indicate the number a number of rings for future use in processing calls for that subscriber. The interface 153 forwards the ring count change data packets to the platform 153. The interface also receives data signals from the MSP 153, for example acknowledgements of transmitted data and/or signals indicating actual changes of status information by the switching system 110. In enhanced embodiments, the interface might include some data processing capabilities, as well. Also, the interface can provide instructions to change some other parameter of the call forwarding procedure, such as the subscriber's forwarding number.

The multi-services platform 153 connects to the end office switching system 110 via a recent change-memory administration channel (RC-MAC) 155. RC-MAC 155 is a data link to the processor of the switching system 110 for inputting data into the translation tables used by the switching system 110 to control switched communications operations with regard to each subscriber's line. The multi-services platform is a processor for receiving various service change instructions, including those from the interface 151 and from other sources, processing the instructions as necessary to make them compatible with switch programming, and forwarding instructions to the switching system 110 to change specific relevant translation table data stored in the switching system. In response to the change of status data from the ring count interface 151, the multi-services platform 153 provides appropriate data packet signals on the RC-MAC channel 155 to the end office switching system 110 to change a particular subscriber's ring count for forwarding on no answer. The instructions from the MSP 153 will identify a specific subscriber's line and will specify a ring count or ringing interval for use in determining when a call for that subscriber has gone unanswered and should be forwarded to the voice mail system 120. The multi-services platform may also forward instructions to change other parameters of the call forwarding function.

Operation via an RC-MAC channel to change data in a switching system relating to call forwarding is described in U.S. Pat. No. 5,012,511 to Hanle et al., the disclosure of which is incorporated herein in its entirety by reference. The multi-services platform 153 is the same as or substantially similar to a processor used in the patented system to process various translation memory change requests, both from RC-MAC terminals and a voice response unit.

Overview of Operation of Voice Mail Network

In various operations discussed in more detail below, calls can be forwarded to the voice mail system 120 in response to calls to subscriber's lines. The switching system 110 may also route some calls directly to the voice mail system 120 in response to callers dialing a telephone number assigned to the lines 143 going to the voice mail system 120. When the end office switching system 110 directs a call to the voice mail system 120, whether as a forwarded call or as a direct call in response to dialing of a number for accessing the system 120, the switching system places the call on any available channel on the multi-line hunt group lines 143.

When the end office switching system 110 forwards a call to the voice mail system 120, the switching system 110 will also provide various data relating to the call via one of the SMDI links 141 and the MIU 127. In particular, the switching system 110 transmits data to the MCU 123 of the voice mail system 120 indicating which line of the multi-line hunt group 143, i.e. which T1 trunk and which channel on the trunk, that the new call will come in on. The exchange 110 also transmits data via SMDI link 141 identifying the called telephone number and the telephone number of the caller. For a call forwarded to a mailbox, the data from the exchange indicates the reason for the forwarding, and the caller telephone number (typically the directory number assigned to the called subscriber's normal telephone line) identifies which subscriber the forwarded call relates to. The master control unit 123 uses the multi-line hunt group line information and the subscriber's directory number to internally route the forwarded call though DSS switch 121 and one of the internal T1 links 128 to an available voice processing unit 125 and identifies the relevant subscriber to that voice processing unit via the Ethernet 125.

For each party who subscribes to a voice mail service provided by the centralized messaging system 120, the MCU 123 stores information designating one of the voice processing units 125 as the "home" unit for that subscriber. Each voice processing unit 125 stores generic elements of prompt messages in a common area of its memory. Personalized elements of prompt messages, for example recorded representations of each subscriber's name spoken in the subscriber's own voice, are stored in designated memory locations within the subscriber's "home" voice processing unit.

In voice mail systems of the type discussed above, a subscriber's "mailbox" does not actually correspond to a particular area of memory. Instead, the messages are stored in each "mailbox" by storing appropriate identification or tag data to identify the subscriber or subscriber's mailbox which each message corresponds to.

Each time a call comes in to the voice mail system 120, the master control unit 123 controls the digital switching system 121 to provide a multiplexed voice channel connection through to one of the voice processing units 125. Typically, the call connection goes to the "home" voice processing unit for the relevant subscriber. The voice mail subscriber is identified by data transmitted from the switching system 110, as described above, if the call is a forwarded call. If all 24 T1 channels to the "home" voice processing unit are engaged, the central processing unit 123 controls switch 121 to route the call to another voice processing unit 125 which is currently available.

The voice processing unit connected to the call retrieves prompt messages and/or previously stored messages from its memory and transmits them back to the calling party via the internal T1 line 128, the DSS switch 121 one of the MLHG lines 143, end office switching system 110 and the calling party's telephone line, such as line 135 or line 137. The voice processing unit 125 connected to the call receives incoming messages from the caller through a similar route and stores those messages in digital form in its associated mass storage device.

When the incoming call is a forwarded call, the connected voice processing unit 125 provides an answering prompt message to the caller, typically including a personalized message recorded by the called subscriber. After the prompt, the voice processing unit 125 records a message from the caller and identifies that stored message as one for the called subscriber's mailbox.

At times the connected voice processing unit 125 will not have all necessary outgoing messages stored within its own associated memory. For example, a forwarded call normally will be connected to the called subscriber's "home" voice processing unit 125, but if the home unit is not available the forwarded call will be connected to a voice processing unit 125 other than the subscriber's home voice processing unit. In such a case, the connected unit 125 requests and receives from the home unit 125 the personalized components of the answering prompt message via the data network 129. The connected voice processing unit 125 will store the transferred message data in its own memory, and when necessary, will play back the transferred data from its own memory as outgoing messages in the exact same manner as for any prompts or greeting messages originally stored in its own memory.

The connected voice processing unit 125 also will store any incoming message in its own associated memory together with data identifying the message as one stored for the called subscriber's mailbox. As a result, the system 120 actually may store a number of messages for any given subscriber or mailbox in several different voice processing units 125. Subsequently, when the voice mail subscriber calls in to the voice mail system 120 to access the subscriber's mailbox, the call is connected to one voice processing unit 125. Again, this call typically goes to the home unit 125 but would go to a different available one of the units 125 if the home unit is not available at the time. In response to appropriate DTMF control signals received from the subscriber, the connected voice processing unit retrieves the subscriber's messages from its own memory and plays the messages back to the subscriber. If any messages are stored in other voice processing units, the connected unit 125 sends a request the other units 125 to download any messages for the subscriber's mailbox those units have actually stored. The downloaded messages are stored in the memory of the connected voice processing unit 125 which replays them to the subscriber.

Voice Mail Architecture in (AIN) Network

Figure 6:
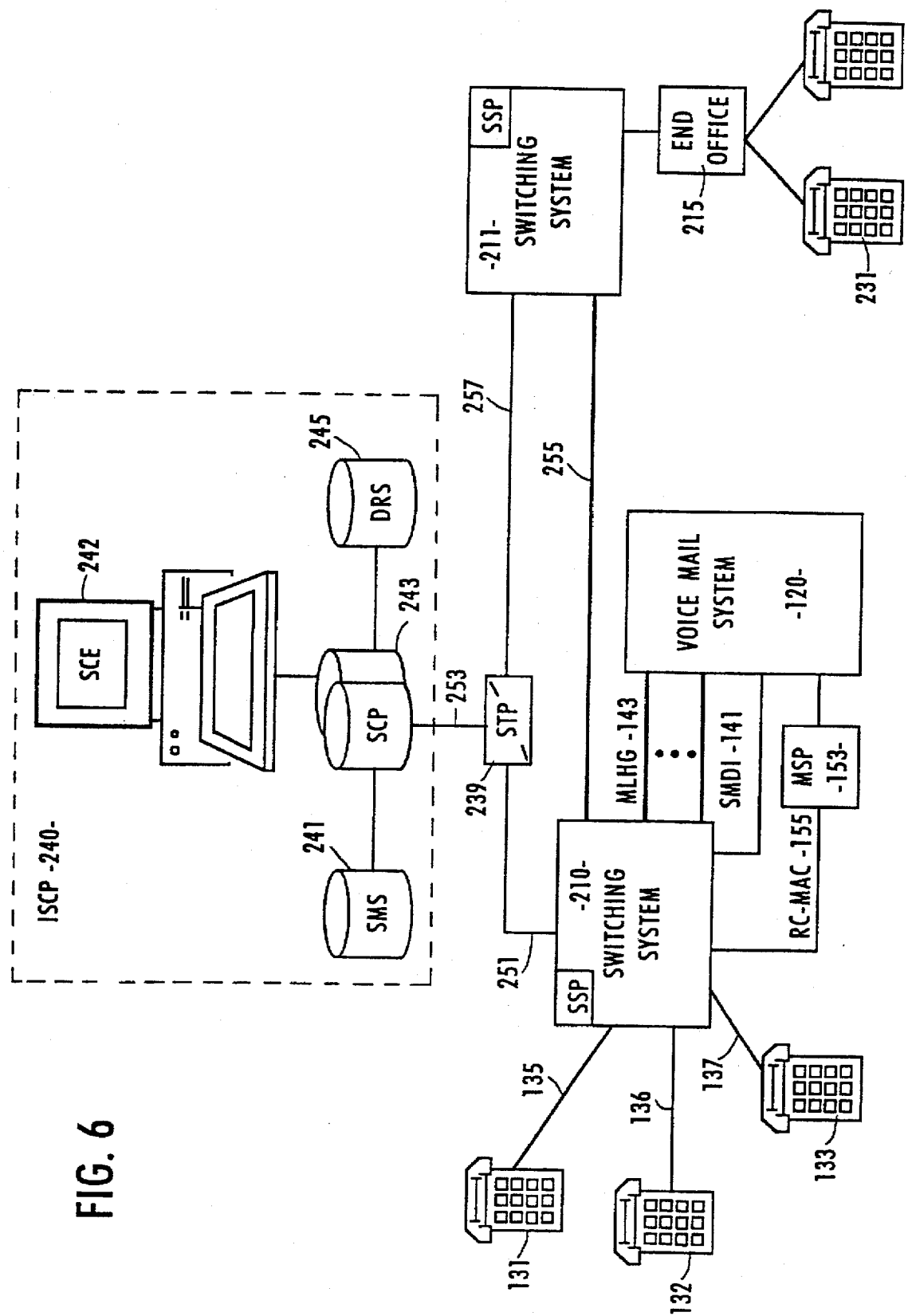
FIG. 6 shows the voice mail system of FIG. 5 incorporated in a common channel signaling network.

FIG. 6 shows an architecture for providing centralized messaging type services, such as voice mail, using AIN for its conventional purpose. In the communication system shown in that drawing, elements corresponding to identical elements in FIG. 5 are identified with identical reference numerals. For example, the voice mail system 120 in FIG. 5 is identical to that shown in FIG. 5 (?) and connects to the switching system via the multi-line hunt group (MLHG) 143, the SMDI links 141, the multi-services platform or MSP 153 and the associated RC-MAC channel 155. The voice mail system 120 operates essentially as described above, with respect to FIG. 5.

In the embodiment of FIG. 6, the end office switching system 210 is a Service Switching Point (SSP) capable switching system. SSP's are appropriately equipped programmable switches (such as a 5ESS) present in the telephone network, which recognize AIN type calls, launch queries to the ISCP and receive commands and data from the ISCP to further process the AIN calls. The SSP functionality may reside in an end office such as shown at 2110, or the SSP functionality may reside in a tandem office such as shown at 211, which in turn provides trunk connections to one or more other end offices 215 which lack SSP capability. End offices without such functionality route AIN calls to one of the SSP type offices.

The SSP's 210 and 211 connect to each other via trunk circuits for carrying large numbers of voice communications, such as the trunk circuit shown as thick dark line 255 in FIG. 6. The SSP's 210 and 211 also connect to an STP 239 via data links 251, 257, for signaling purposes. An STP can connect to a large number of the SSP's. The STP 239 provides data signaling communications between the SSP's 210, 211 and with the ISCP 240. Although shown as a single STP, the AIN may include a number of STP's organized in an appropriate hierarchy to handle the expected level of signaling traffic. The data links 251, 257 between the SSP type switching systems 210, 211 and the STP 239 are typically SS7 (Signaling System 7) type CCIS interoffice data communication channels. The STP 239 in turn connects to other STP's and to the ISCP via a packet switched network 253 which may also be an SS7 network. The above described data signaling network between the SSP type offices and the ISCP is preferred, but other signaling networks could be used.

The messages transmitted between the SSP's 210, 211 and the ISCP 240 are all formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from an SSP includes among other data a "Service Key" which is the calling party's address, and the digits dialed by the caller. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits.

There could be one or more ISCP's per state, to avoid overloading existing CCIS data links. Alternatively, the ISCP could be implemented on a LATA by LATA basis or on a regional operating company basis, i.e. one database for the entire geographic area serviced by one of the Regional Bell Operating Companies. In fact, if federal regulations permit, the database service may be offered nationwide.

The ISCP 240 is an integrated system. Among other system components, the ISCP 240 includes a Service Management System (SMS) 241, a Data and Reporting System (DRS) 245 and the actual database referred to as a Service Control Point (SCP) 243. The ISCP 240 also typically includes a terminal subsystem referred to as a Service Creation Environment or SCE 242, for programming the database in the SCP 243 for the services subscribed to by each individual subscriber to one of the AIN services. The SMS 241 validates service logic and data entered by the TELCO or the subscriber, and manages the process of actually updating the data files in the SCP database 243.

Each central office switching system or SSP normally responds to a service request on a local communication line connected thereto, for example an off-hook followed by dialed digit information, to selectively connect the requesting line to another selected local communication line. The connection may be made locally through only the connected central office switching system. For example, for a call from station 131 to station 132 the end office type SSP 210 provides the call connection without any connection to another central office. When the called line connects to a distant station, for example for a call from station 11 to station 231, the connection is made through the connected end office switching system SSP 210 and at least one other central office switching system, such as tandem SSP 211 and end office 215, by means of the telephone trunks interconnecting the various office switching systems.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in channel signaling, the trunks would be engaged before a determination is made that the called line is available or busy. Particularly if the called line is busy, this would unnecessarily tie up limited trunk capacity. The CCIS system through the STP's originally was developed to alleviate this problem.

In the CCIS type call processing method, the local central office suspends the call and sends a query message through one or more of STP's. The query message goes to the central office to which the called station is connected, referred to as the "terminating" central office. The terminating central office determines whether or not the called station is busy. If the called station is busy, the terminating central office so informs the originating central office which in turn provides a busy signal to the calling station. If the called station is not busy, the terminating central office so informs the originating central office. A telephone connection is then constructed via the trunks and central offices of the network between the calling and called stations. The receiving central office then provides a ringing signal to the called station and sends ringback tone back through the connection to the calling station.

The call processing routines discussed above are similar to those used in existing networks to complete calls between stations. In an AIN type network system, these normal call processing routines would still be executed for completion of calls between customer stations, when call processing does not involve one of the AIN services.

In an Advanced Intelligent Network (AIN) type system, such as shown in FIG. 6, certain calls receive specialized AIN type processing under control of data files stored in the SCP database 243 within the ISCP 240. In such a network, the SSP type offices 210, 211 of the public telephone network detect a call processing event identified as an AIN "trigger". For ordinary telephone service calls, there would be no event to trigger AIN processing; and the local and toll office switches would function normally and process such calls as discussed above, without referring to the SCP database 243 for instructions. An SSP type switching office which detects a trigger, however, will suspend call processing, compile a TCAP formatted call data message or "query" and forward that message via a common channel interoffice signaling (CCIS) link 251 or 257, the STP 239, and link 253 to the ISCP 240 which includes the SCP database 243.

The TCAP query message contains a substantial amount of information, including for example data identifying the off-hook line, the number dialed and the current time. Depending on the particular AIN service, the ISCP uses a piece of data from the query message to identify a subscriber and access the subscriber's files. For example, for some form of terminating type AIN service the dialed number would correspond to the called AIN subscriber, therefore the ISCP 240 uses the dialed number to access the subscriber's data file within the SCP database 243. From the accessed data, the ISCP 240 determines what action to take next. If needed, the ISCP 240 can instruct the central office to obtain and forward additional information, e.g. by playing an announcement and collecting dialed digits.

Once sufficient information about the call has reached the ISCP 240, the ISCP accesses its stored data tables to translate the received message data into a call control message. The call control message may include a substantial variety of information including, for example a destination number and trunk group selection information. The ISCP 240 returns the call control message to the particular SSP 210 or 211 which initiated the query via CCIS links and the STP 239. The SSP then uses the call control message to complete the particular call through the network.

The SSP type switches can recognize a variety of events as triggers for activating a query and response type AIN interaction with the ISCP, and different AIN services use different types of triggers. The present invention involves a call forwarding or call redirect type AIN service and uses a dialed destination number as the triggering event. This type of trigger is sometimes referred to as a terminating trigger. Other types of AIN type services using the dialed number of the terminating station or subscriber as the trigger are disclosed in commonly assigned U.S. Pat. No. 5,353,331 entitled Personal Communication Services Using Wireless/ Wireline Integration, and U.S. patent application Ser. No. 07/888,098 filed May 26, 1992, entitled Method for Concurrently Establishing Switch Redirection for Multiple Lines, the disclosures of these two commonly assigned applications being incorporated herein in their entirety by reference.

In the AIN embodiment shown in FIG. 6, the voice mail system 120 operates exactly as in the first embodiment shown in FIG. 5. The SSP type switching system 210 provides a forward on 'no answer' condition of the type used in the embodiment of FIG. 5. The difference is that the switching system 210 will use the forwarding operation only for the high count forwarding when no new message is stored. In such cases, the switching system 110 will use only one relatively high ring count threshold for all calls to any given voice mail subscriber's line. This threshold value may be a high default value. The SSP type switching system 210 will execute this forwarding routine with a high threshold for calls to a subscriber after a signal from the voice mail system indicating that all new messages for that subscriber have been replayed.

In switch based call forwarding of the type discussed above, if a called subscriber's line is available, the switching system terminates calls for a subscriber on the subscriber's line. The switching system forwards the call to the forwarding number, e.g. a number associated with the multi-line hunt group 143 into the voice mail system, only if no one answers the call for a certain ringing interval or a certain ring count. In an AIN, such as shown in FIG. 6, the network can reroute a call without first terminating the call on the called line. The AIN actually redirects the call to the destination during initial call processing, without waiting for a no-answer condition. The illustrated AIN embodiments of the present invention rely on such AIN type call redirection to route calls for subscriber's who have messages waiting directly to the voice mail system 120.

To initiate AIN type call redirection, the switching system sets a destination number trigger in its internal translation information associated with a particular subscriber's line. The trigger is set in response to a signal from the voice mail system 120 indicating that the system 120 has stored new messages for that subscriber.

While the trigger associated with a subscriber's line is active, when the SSP switching system 210 receives a call to that subscriber, the SSP will suspend call processing and query the ISCP 220 for a destination number to actually route the call to. The ISCP 240 will return a number associated with the multi-line hunt group 143, and the SSP type switching system 210 will connect the call to one of the lines of that group 143. To the caller, the first ringback heard will correspond to the first ring at the voice mail system. This results in a forwarding to the voice mail system without a prior ring.

In the system of FIG. 6, the voice mail system 120 will still send some form of signal to the switching system 210 through the interface 151, the MSP 153 and the RC-MAC channel 155 equivalent to the ring count change to high instruction. In response, the switching system 210 will cancel the terminating trigger designation associated with the particular subscriber's line. The next call to the subscriber will therefore be forwarded by the switch after a high number of rings without an answer on the subscriber's line.

The construction and operation of the voice mail systems shown in FIGS. 5 and 6 are described more fully in commonly assigned patent application Ser. No. 08/121,855 filed Sep. 17, 1993, entitled Toll Saver for Centralized Messaging Systems, the disclosure of which commonly assigned application is incorporated herein in its entirety by reference.

Figure 4:
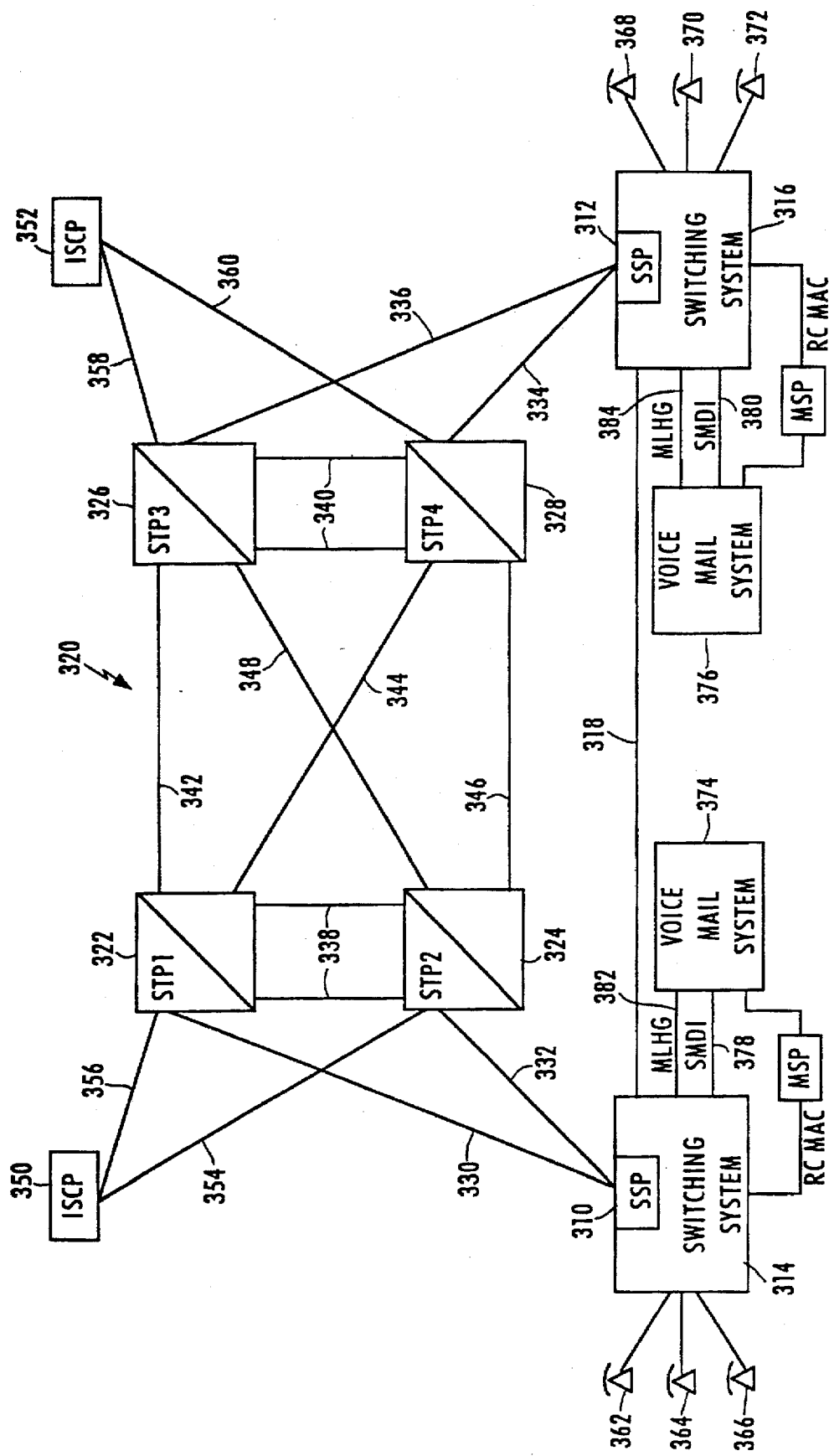
FIG. 4 shows a simplified diagram of a public switched telephone network equipped with central messaging systems for implementing the system and method of the invention.

Referring to FIG. 4 there is shown a simplified diagram of a public switched network such as illustrated and described with more detail in connection with FIG. 1. The network in FIG. 4 includes a voice mail system associated with each of the switching systems. FIG. 4 shows two SSP's 310 and 312 which comprise end office switching systems 314 and 316. The end office 314 represents an end office in the region of one regional operating company, while end office 316 represents an end office in the region of a different operating company. The SSP's in a given region are connected together by local trunks (not shown) and the SSP's 310 and 312 are connected via access tandems (not shown) and inter-exchange carrier network trunks or ICN trunk 318 in FIG. 4.

The SS7 network, indicated generally at 320, includes a series of STP's 322, 324, 326 and 328 designated STP 1, STP 2, STP 3 and STP 4. Each STP is connected to the other STP's by A links indicated at 330, 332, 334 and 336. STP 1 and STP 2 constitute a mated pair of STP's connected by C links 338, each mated pair serving its respective transport area. STP 1 is connected to STP 3 by B link 342 and to STP 4 by D link 344. STP 2 is connected to STP 4 by B link 346 and by D link 348.

The STP's are connected to ISCP's 350 and 352 by A links 354, 356, 358 and 360.

Each switching system 314 and 316 in this illustration comprises an end office and is connected to customer premises equipment, illustrated as telephone stations 362, 364, 366, 368, 370 and 372. Local telephone lines or local loops serve as communication links between each of the telephone stations and its end office switching system. It will be understood that the subscriber station equipment may also comprise other communication devices compatible with the line, such as facsimile devices, modems, etc.

Each switching system 314 and 316 is also provided with a centralized message service or voice mail system shown in FIG. 4 as 374 and 376. These systems may be of the type illustrated and described in detail in connection with FIG. 5 and 6. Although referred to as voice messaging equipment, the systems 374 and 376 may have the capability of storing messages of a variety of different types as well as voice messages. For example, a single system may receive incoming messages in the form of audible messages such as voice messages, as well as text format data messages. The equipment may also store messages in an image data format such as facsimile.

The voice mail systems 374 and 376 connect to the switching systems 314 and 316 via SMDI data lines 378 and 380 and by multi-line hunt groups (MLHG's) 382 and 384. Typically, the MLHG lines consist of a number of T1 type trunk circuits which each carry 24 voice channels in digital time division multiplexed format.

The operation of the system shown in FIG. 4 according to the invention may be as follows:

A subscriber associated with telephone station 362 desiring to leave a voice message in the mailbox of a remote subscriber, such as the subscriber associated with telephone station 368, may use a telephone station to access his own voice mailbox in the voice mail system 374. This may be accomplished by dialing a number associated with the voice mail system 374 for this purpose. The voice processing unit of the voice mail system may operate its voice menu to direct the caller to depress a specified key when satisfied with the message in a known fashion. It may then query the caller as to whether he desired to send the message and, if so, to depress another specified key. The voice unit then will instruct the caller as to the procedure for keying in the identify of the destination and to depress a further specified key to send the message. This foregoing procedure is not intended to be exclusive and other procedures for leaving and commanding the dispatch of a message which are described in the background patents discussed above may be utilized. In all cases the message is digitized in conventional fashion and stored in the mailbox of the sender. The caller may go on-hook after depressing the designated send key. The depression of the send key causes the generation of a tone or signal which is recognized by the SSP 310 as a trigger.

Figure 7:
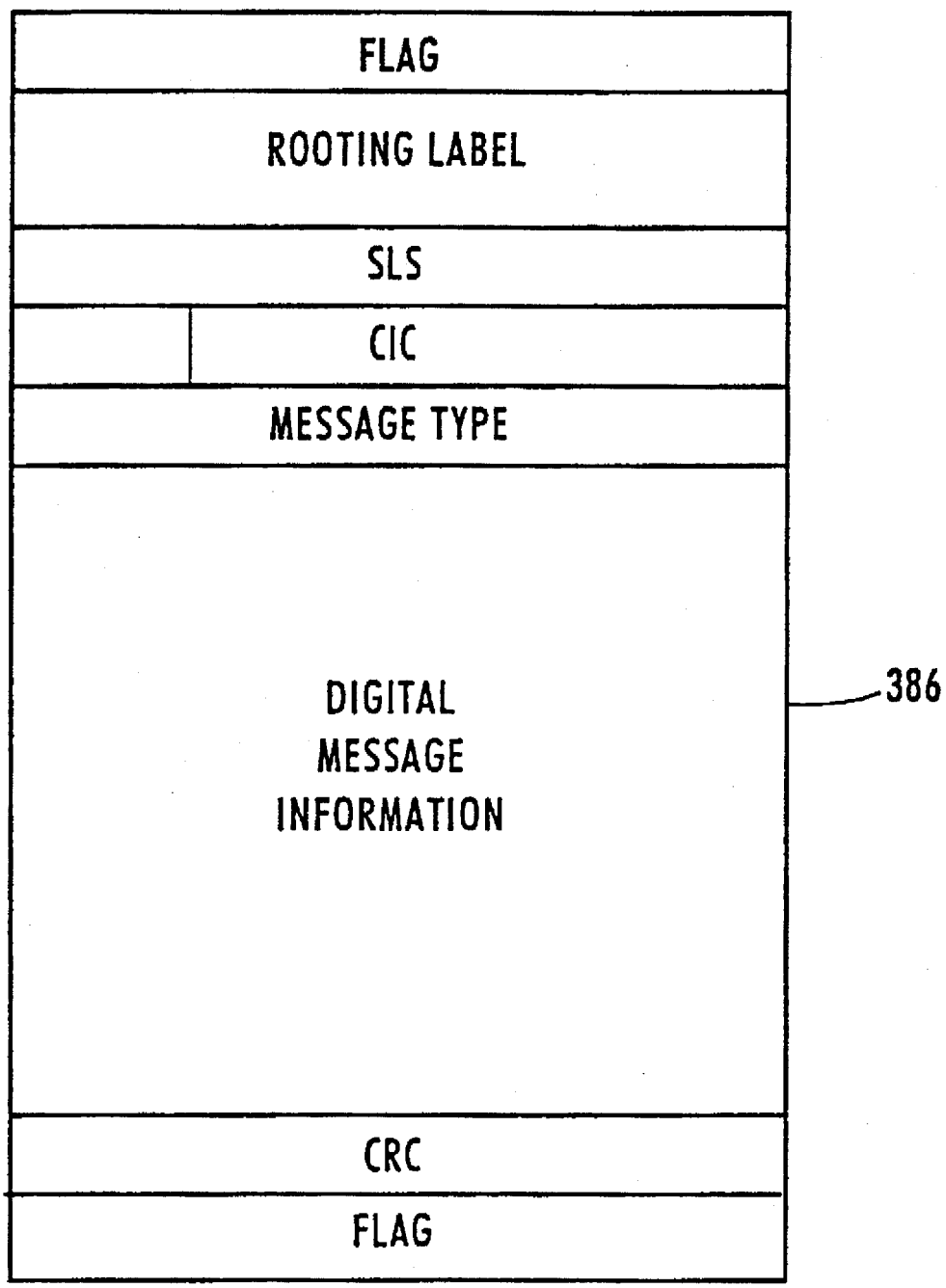
FIG. 7 illustrates a packet carrying digital message information according to the invention.

In response to the trigger, the SSP frames a TCAP inquiry message which is directed via one or more of the STP's 322 and 324 to the ISCP 350 for instructions. The TCAP message includes information identifying the calling station and mailbox and the called station and the fact that the caller is requesting mailbox-to-mailbox message transfer. The ISCP consults its database to establish the existence and identity of a mailbox for the called number. If the identity of such a mailbox is found, the ISCP then originates a response to the SSP to packetize and dispatch one or more SS7 packets to the called directory number and mailbox (if available) with an appropriate routing label and handling instructions and carrying as the included information in the SS7 packets the digitized voice retrieved from the mailbox of the sender. An illustrative packet is shown in FIG. 7 with the digital message information incorporated at 386. The information may be in T1 protocol which is conventionally the output digital signal of mailbox equipment used in the public switched telephone networks regardless of manufacture. Thus any translation which is necessary between the digitized message in the mailbox and the T1 or equivalent protocol used in the SS7 packets inherently occurs in the equipment furnished by the voice mail system manufacturer.

The number of SS7 packets which may be required will be dependent upon the length of the message as in conventional packet communication. Each packet includes suitable header information in the conventional manner. In this case if the identity of the destination mailbox was established from the database of the ISCP 350, that identity will be included in the outgoing packets. However, if the existence and/or identity of a mailbox associated with the destination directory number is not subject to determination in the database of the ISCP 350, the SSP 310 is instructed by the ISCP 350 to include in the packet header appropriate directions to the remote SSP 312 to cause triggering and the formation and dispatch of a TCAP inquiry message to the associated ISCP 352. In such a case the ISCP 352 conducts a dip of its database and provides the requested information to the SSP 312. The packet is thereupon processed through the SSP 312 and voice mail system 376 to digitally record the contents of the remotely originated information. Again the voice mail system is so designed as to inherently handle any translation necessary to communicate with the switching system in T1 or equivalent protocol. The fact that the packets may not arrive at the destination in the same order as originated is of no consequence in that real-time voice communication is not involved in the transfer.

The dispatched SS7 packet communication proceeds through the common channel signaling SS7 network until all of the packets are received at the destination. It is a feature of the invention that the redundancy of the SS7 network and packet switching techniques permits packets traveling different routes to the same destination. This redundancy is utilized as a feature of the invention to enable to existing SS7 network to handle the digital packet communication involved without requiring modification of the SS7 system.

When the packets reach the destination SSP 312 and have been deposited in the mailbox of the addressee, the voice mail system 376 effects customary notification of the mailbox proprietor that a message is waiting. The proprietor may then access the mailbox in conventional fashion and have the message delivered as an audio voice message in the usual fashion. The recipient then has the option of returning a message in a converse fashion by depressing the appropriate keys at his telephone station which utilize the information in the packet header to reverse the origination and destination identifications. If the mailbox-to-mailbox communication feature is furnished by the involved telephone companies as an extra feature, it will be appreciated that either or both ISCP's 350 and 352 may ascertain from their appropriate databases the authorization of the user to access the service.

Because currently available ISCP's include billing modules they may also effect billing. The data may be sent out through the ISCP so that it can either be directed to the revenue accounting office on a direct line or it may send a TCAP message back into the SSP or end office switch to the originating number responsible for the origination of the call. Billing can be accomplished in any desired fashion, such as an bits per second, call set-up, number of packets, or any combination of the same. The billing information may go into the journal on the switch to be forwarded to the revenue accounting office.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. In a switched telecommunications network comprising:
 a first central office switching system connected to subscriber lines connected to subscriber premises terminals including at least one service switching point for selectively providing switched communications between subscriber lines;
 a second central office switching system connected to subscriber lines connected to subscriber premises terminals including at least one service switching point for selectively providing switched communications between subscriber lines;
 a network controller arranged separately from the central office switching systems and being connected by a common channel signaling network to at least the service switching points connected to said central office switching systems through at least one service transfer point arranged to convey control data to effect communications, said network controller storing preprogrammed call processing data associated with subscribers who are associated with the subscriber lines connected to subscriber premises terminals connected to the central office switching systems;
 each said switching system providing selective communications between subscriber lines and a centralized messaging system for storing messages directed to individual subscribers (subscriber messages), a method comprising:
 forwarding to one centralized messaging system a subscriber message directed to another centralized messaging system and storing said message in said one centralized messaging system;
 sending an inquiry to said network controller;
 sending a responsive message from said network controller and in response to the message forwarding to said other centralized messaging system via service switching points and at least one service transfer point connected in said common channel signaling network a digital signal which includes the information contained in said subscriber message stored in said one centralized messaging system.

2. A method according to claim 1 wherein said forwarding of a subscriber message to one centralized messaging system includes calling said system from a subscriber premise terminal, initiating a voice message through said terminal, and said storing comprises digitizing and storing said voice message in digital form.

3. A method according to claim 2 wherein a message is delivered to said centralized messaging system in T1 format.

4. A method according to claim 1 wherein any translation in format in the subscriber message occurs as a function of the operation of the centralized messaging system.

5. A method according to claim 1 wherein said inquiry to said network controller and responsive message from said network controller are in Transactional Capabilities Application Part (TCAP) protocol.

6. A method according to claim 1 wherein the information contained in said subscriber message is forwarded in Common Channel Signaling 7 (CCS7) format.

7. A method according to claim 1 wherein the information contained in said subscriber message is forwarded by packet switching via said common channel signaling network.

8. A method according to claim 1 including the step of storing said forwarded information in said other centralized messaging system.

9. A method according to claim 8 including the step of delivering the information stored in said other centralized messaging system as real-time analog audio information.

10. A method according to claim 9 wherein the subscriber message forwarded to said one centralized messaging system and stored therein is initiated as a real time audio signal.

11. A method according to claim 10 wherein the message is initiated and delivered via premises terminals comprising telephone stations.

12. A method according to claim 11 wherein said forwarding of said information from one centralized messaging system to the other centralized messaging system is effected between said first and second central office switching systems without the use of trunking connections therebetween.

13. A method according to claim 12 wherein said forwarding of said information is effected without applying ringing signal.

14. A method according to claim 1 wherein said network controller, service switching points and service transfer points comprise at least a portion of a Common Channel Signaling System 7 (CCS7) associated with said central office switching systems.

15. A method according to claim 1 including a second network controller arranged separately from the central office switching systems and being connected by said common channel signaling network to at least the service switching points connected to said central office switching systems through at least one service transfer point arranged to convey control data to effect communications, said second network controller storing pre-programmed call processing data associated with subscribers who are associated with the subscriber lines connected to subscriber premises terminals connected to the central office switching systems.

16. A method according to claim 15 wherein the step of forwarding to said other centralized messaging system the information contained in said message stored in said one centralized messaging system includes the steps of sending an inquiry to said second network controller, sending a responsive message from said second network controller, and in response to said responsive message from said second network controller storing said information in said other centralized messaging system.

17. A method according to claim 16 wherein said inquiries to said network controllers and said responsive messages from said network controllers are in Transactional Capabilities Application Part (TCAP) protocol.

18. A method according to claim 17 including the steps of delivering the information stored in said other centralized messaging system as real-time analog audio information, and inputting the subscriber message forwarded to said one centralized messaging system as real-time audio information.

19. A method according to claim 18 wherein said message is initiated and delivered via subscriber premises terminals comprising telephone stations.

20. In a switched communications network comprising a plurality of service switching points associated with subscriber lines connected to subscriber premises terminals, said service switching points being connected by trunks for selectively providing switched communications between subscriber lines, a network controller arranged separately from the trunks and being connected by a common channel signaling network to at least some of the service switching points through at least one service transfer point arranged to convey control data to effect communications, said network controller storing pre-programmed call processing data associated with subscribers who are associated with the subscriber lines connected to subscriber premises terminals, at least two of said service switching points being connected to centralized messaging systems for storing messages directed to individual subscribers (subscriber messages), a method comprising:

forwarding to one centralized messaging system a subscriber message directed to another centralized messaging system and storing said message in said one centralized messaging system;

sending an inquiry to said network controller;

sending a responsive message from said network controller and in response to the message forwarding to said other centralized messaging system via service switching points and at least one service transfer point connected in said common channel signaling network the information contained in said subscriber message stored in said one centralized messaging system.

21. A method according to claim 20 wherein said forwarding of a subscriber message to one centralized messaging system includes calling said system from a subscriber premise terminal, initiating a voice message comprising said subscriber message through said terminal, and said storing comprises digitizing and storing said voice message in digital form.

22. A method according to claim 20 wherein said information is forwarded to said other centralized messaging system in digital format.

23. A method according to claim 22 wherein any translation in format in the message occurs as a function of the operation of a centralized messaging system.

24. A method according to claim 20 wherein said inquiry to said network controller and said responsive message from said network controller are in Transactional Capabilities Application Part (TCAP) protocol.

25. A method according to claim 20 wherein the information contained in said message is forwarded in Common Channel Signaling format.

26. A method according to claim 20 wherein the information contained in said message is forwarded by packet switching via a Common Channel Signaling network associated with said network controller.

27. A method according to claim 20 including the step of storing said forwarded information in a centralized messaging system other than the centralized messaging system from which the information originated.

28. A method according to claim 27 including the step of delivering the information stored in the other centralized messaging system as real-time analog audio information.

29. A method according to claim 28 wherein the message forwarded to one centralized messaging system and stored therein is initiated as real time audio information.

30. A method according to claim 29 wherein said message is initiated and delivered via premise terminals comprising telephone stations.

31. A method according to claim 30 wherein said forwarding of said information from one centralized messaging system to the other centralized messaging system is effected between service switching points without the use of trunking connections therebetween.

32. A switched telecommunications network comprising:
a first central office switching system connected to subscriber lines connected to subscriber premises terminals including at least one service switching point for selectively providing switched communications between subscriber lines;
a second central office switching system connected to subscriber lines connected to subscriber premises terminals including at least one service switching point for selectively providing switched communications between subscriber lines;
a network controller arranged separately from the central office switching systems and being connected by a common channel signaling network to at least the service switching points connected to said central office switching systems through at least one service transfer point arranged to convey control data to effect communications, said network controller storing pre-programmed call processing data associated with subscribers who are associated with the subscriber lines connected to subscriber premises terminals connected to the central office switching systems;
each said switching system providing selective communications between subscriber lines and a centralized messaging system for storing messages directed to individual subscribers (subscriber messages), said service switching points having originating triggers for responding to signals from said central office switches intended to transfer a subscriber message from one centralized messaging system to another centralized messaging system to send an inquiry to said network controller, said network controller sending a responsive message causing said service switching point to forward the subscriber message from said one centralized messaging system to said other centralized messaging system via service switching points and at least one service transfer point in said common channel signaling network.

33. A switched communications network comprising a plurality of service switching points associated with subscriber lines connected to subscriber premises terminals, said service switching points being connected by trunks for selectively providing switched communications between subscriber lines, a network controller arranged separately from the trunks and being connected by a common channel signaling network to at least some of the service switching points through at least one service transfer point arranged to convey control data to effect communications, said network controller storing pre-programmed call processing data associated with subscribers who are associated with the subscriber lines connected to subscriber premises terminals, at least two of said service switching points being connected to centralized messaging systems for storing messages directed to individual subscribers (subscriber messages), said service switching points connected to said centralized switching systems having originating triggers for responding to signals intended to transfer a subscriber message from one centralized messaging system to another centralized messaging system to send an inquiry to said network controller, said network controller sending a responsive message causing said service switching point to forward the subscriber message from said one centralized messaging system to the other centralized messaging system via service switching points and at least one service transfer point in said common channel signaling network.

34. A switched communications network according to claim 33 wherein said subscriber message to be forwarded was stored in one centralized messaging system in digital form by a call to said system from a subscriber premise terminal.

35. A switched communications network according to claim 33 wherein said information is forwarded to said other centralized messaging system in digital format.

36. A switched communications network according to claim 35 wherein said centralized messaging systems effect any translation in format in the subscriber message.

37. A switched communications network according to claim 33 wherein said inquiry to said network controller and said responsive message from said network controller are in Transactional Capabilities Application Part (TCAP) protocol.

38. A switched communications network according to claim 33 wherein the information contained in said subscriber message is forwarded in Common Channel Signaling format.

39. A switched communications network according to claim 33 wherein the information contained in said subscriber message is forwarded by packet switching via a Common Channel Signaling network associated with said network controller.

40. A switched communications network according to claim 33 wherein the centralized messaging system other than the centralized messaging system from which the information originated stores said information therein.

41. A switched communications network according to claim 40 wherein the information stored in the other centralized messaging system is delivered as real-time analog audio information.

42. A switched communications network according to claim 41 wherein the subscriber message forwarded to said other centralized messaging system and stored therein was initiated as a real time audio signal and stored as a digital signal in the initiating centralized messaging system.

43. A switched communications network according to claim 42 wherein said forwarding of said information from one centralized messaging system to the other centralized messaging system is effected between service switching points without the use of trunking connections therebetween.

44. A method of forwarding a digitized voice message stored in one centralized message system in a switched telecommunications network having switching systems connected together by trunks to another centralized messaging system, which switching systems are controlled by a network controller arranged separately from the trunks and forming part of a common channel signaling system, comprising the steps of incorporating said digitized voice message into common channel signaling packets, transporting said packets via packet switching through at least one service transfer point in said common channel signaling network, and storing said digitized voice message in said other centralized messaging system.

45. In a switched telecommunications network comprising:
a first central office switching system connected to subscriber lines connected to subscriber premises terminals including at least one service switching point for selectively providing switched communications between subscriber lines;
a second central office switching system connected to subscriber lines connected to subscriber premises terminals including at least one service switching point for selectively providing switched communications between subscriber lines;

said central office switching systems being connected by trunks for connecting subscriber lines of said first central office switching system to subscriber lines of said second central office switching system to connect said subscriber premise terminals together by a subscriber line-trunk-line connection;

a network controller and common channel signaling network arranged separately from the central office switching systems and being connected to at least the service switching points connected to said central office switching systems through at least one service transfer point arranged to convey common channel signal digital control data to effect connection between subscriber terminals, said network controller storing preprogrammed call processing data associated with subscribers who are associated with the subscriber lines connected to consumer premises terminals connected to the central office switching systems;

each said switching system providing selective communications between subscriber lines and the centralized messaging system for that switching system for storing messages directed to individual subscribers in that system (subscriber messages), a method comprising:

forwarding to one centralized messaging system an analog subscriber message directed to another centralized messaging system, digitizing said subscriber message and storing said message in digital form in said one centralized messaging system;

forwarding to said other centralized messaging system via service switching points and at least one service transfer point in said common channel signaling network a digital signal containing the information contained in said subscriber message stored in said one centralized messaging system.

* * * * *